United States Patent
Hayakawa

(10) Patent No.: US 12,280,900 B2
(45) Date of Patent: Apr. 22, 2025

(54) FLYING BODY, CONTROL METHOD, AND PROGRAM

(71) Applicant: SONY GROUP CORPORATION, Tokyo (JP)

(72) Inventor: Koichi Hayakawa, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 198 days.

(21) Appl. No.: 17/632,999

(22) PCT Filed: Jul. 3, 2020

(86) PCT No.: PCT/JP2020/026186
§ 371 (c)(1),
(2) Date: Feb. 4, 2022

(87) PCT Pub. No.: WO2021/053929
PCT Pub. Date: Mar. 25, 2021

(65) Prior Publication Data
US 2022/0289376 A1 Sep. 15, 2022

(30) Foreign Application Priority Data
Sep. 17, 2019 (JP) .................. 2019-167955

(51) Int. Cl.
*B64U 70/90* (2023.01)
*G05D 1/00* (2006.01)
*B64U 10/13* (2023.01)

(52) U.S. Cl.
CPC ............ *B64U 70/90* (2023.01); *G05D 1/101* (2013.01); *B64U 10/13* (2023.01)

(58) Field of Classification Search
CPC .... B64C 39/024; G05D 1/101; G05D 1/0653; G05D 1/0858; B64U 70/00; B64U 70/40; B64U 10/13; B64U 10/14; B64U 10/20; B64U 40/00; B64D 45/04
See application file for complete search history.

(56) References Cited

U.S. PATENT DOCUMENTS

| | | | |
|---|---|---|---|
| 7,871,044 B2* | 1/2011 | Hursig | B64D 45/04 244/81 |
| 9,934,694 B2* | 4/2018 | Navot | G08G 5/0086 |
| 9,994,307 B2* | 6/2018 | Nguyen | B64C 29/00 |
| 10,301,016 B1* | 5/2019 | Bondarev | B64C 29/0033 |
| 10,633,087 B2* | 4/2020 | McCullough | B64C 29/0025 |
| 10,745,115 B2* | 8/2020 | Kimchi | B64C 27/52 |
| 2010/0012776 A1* | 1/2010 | Hursig | G05D 1/0653 244/81 |
| 2012/0298796 A1* | 11/2012 | Carreker | B64G 1/22 244/100 R |

(Continued)

FOREIGN PATENT DOCUMENTS

| | | |
|---|---|---|
| CN | 107957728 A | 4/2018 |
| CN | 109917812 A | 6/2019 |

(Continued)

*Primary Examiner* — Benjamin P Lee
(74) *Attorney, Agent, or Firm* — Paratus Law Group, PLLC

(57) ABSTRACT

A flying body includes a control unit that acquires inclination information regarding inclination of a landing point and sets a horizontal speed according to the inclination information.

14 Claims, 11 Drawing Sheets

(56) References Cited

U.S. PATENT DOCUMENTS

| | | | |
|---|---|---|---|
| 2015/0014475 A1* | 1/2015 | Taylor | B64C 29/00 244/6 |
| 2016/0272308 A1* | 9/2016 | Gentry | B64C 25/001 |
| 2017/0123435 A1* | 5/2017 | Myeong | G05D 1/102 |
| 2017/0274988 A1* | 9/2017 | Nguyen | B64C 25/28 |
| 2017/0308099 A1* | 10/2017 | Kim | G01S 15/08 |
| 2017/0355453 A1* | 12/2017 | Kim | G05D 1/0676 |
| 2018/0229833 A1* | 8/2018 | Kimchi | B64D 31/06 |
| 2019/0144108 A1* | 5/2019 | McCullough | B64C 29/02 244/23 B |
| 2019/0144116 A1* | 5/2019 | Yuan | B64C 27/08 701/3 |
| 2021/0403146 A1* | 12/2021 | Atsumi | B64C 25/001 |
| 2022/0197308 A1* | 6/2022 | Wittmaak, Jr. | G01S 13/882 |
| 2022/0227479 A1* | 7/2022 | Hayakawa | B64U 50/19 |
| 2023/0013275 A1* | 1/2023 | Suzuki | B64U 50/19 |
| 2023/0103063 A1* | 3/2023 | Kikuchi | G01C 15/002 73/579 |
| 2023/0312144 A1* | 10/2023 | Hoshide | B64C 39/02 244/17.23 |

FOREIGN PATENT DOCUMENTS

| | | | |
|---|---|---|---|
| EP | 1995174 A2 | 11/2008 | |
| JP | 2008290704 A * | 12/2008 | B64C 27/20 |
| JP | 2001-328600 A | 11/2011 | |
| JP | 2015-530318 A | 10/2015 | |
| JP | 2018-052341 A | 4/2018 | |
| KR | 20170120500 A * | 10/2017 | B64D 45/04 |
| KR | 20180066872 A * | 6/2018 | H04M 1/72533 |
| RU | 2013107108 A | 8/2014 | |
| WO | WO-2014055269 A1 | 4/2014 | |
| WO | WO 2015/064767 A1 | 5/2015 | |
| WO | WO 2017/098571 A1 | 6/2017 | |

* cited by examiner

FLYING BODY, CONTROL METHOD, AND PROGRAM

CROSS REFERENCE TO PRIOR APPLICATION

This application is a National Stage Patent Application of PCT International Patent Application No. PCT/JP2020/026186 (filed on Jul. 3, 2020) under 35 U.S.C. § 371, which claims priority to Japanese Patent Application No. 2019-167955 filed on Sep. 17, 2019), which are all hereby incorporated by reference in their entirety.

TECHNICAL FIELD

The present disclosure relates to a flying body, a control method, and a program.

BACKGROUND ART

Recently, unmanned autonomous flying bodies (hereinafter appropriately referred to as drones) called unmanned aerial vehicles (UAVs), multicopters, or drones have been used in various situations such as various types of photographing, observation, and disaster relief. Accordingly, various control methods for drones have been proposed (refer to PTL 1, for example).

CITATION LIST

Patent Literature

[PTL 1]
JP 2018-52341 A

SUMMARY

Technical Problem

The point where a drone lands is not necessarily a horizontal surface but may be an inclined surface. When a drone lands on an inclined surface, since the airframe of the drone tends to become unstable, it is desirable that appropriate control be performed on the drone.

The present disclosure has been devised in view of the above-described circumstances and an object of the present disclosure is to provide a flying body, a control method, and a program capable of performing control so that a drone can land in a stable attitude even when a landing point is an inclined surface.

Solution to Problem

The present disclosure is, for example, a flying body including a control unit that acquires inclination information regarding inclination of a landing point and sets a horizontal speed according to the inclination information.

The present disclosure is, for example, a control method in which a control unit acquires inclination information regarding inclination of a landing point and sets a horizontal speed according to the inclination information.

The present disclosure is, for example, a program for causing a computer to execute a control method in which a control unit acquires inclination information regarding inclination of a landing point and sets a horizontal speed according to the inclination information.

DESCRIPTION OF EMBODIMENTS

Hereinafter, embodiments and the like of the present disclosure will be described with reference to the drawings. The description will be made in the following order.
<Problems to be considered in embodiments>
<Overview of embodiments>
<First Embodiment>
<Second Embodiment>
<Third Embodiment>
<Modified examples>

It is to be understood that the embodiments and the like described below are preferable specific examples of the present disclosure and that contents of the present disclosure are not to be limited to such embodiments and the like.

Problems to be Considered in Embodiments

First, to facilitate understanding of the present disclosure, problems to be considered in embodiments will be described with reference to FIGS. 1A and 1B.

Figure 1A:
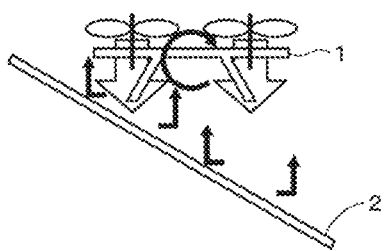
FIGS. 1A and 1B are diagrams referred to when problems to be considered in an embodiment are described.
Figure 1B:
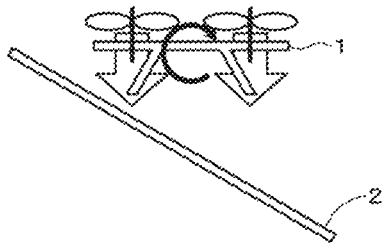

FIGS. 1A and 1B are diagrams schematically illustrating a state in which a drone 1 which is an example of a flying body is landing. The examples illustrated in FIGS. 1A and 1B are examples in which the point where the drone 1 lands (hereinafter, appropriately referred to as a landing point) is an inclined surface 2. Generally, the drone 1 descends vertically and lands while keeping the airframe horizontal. If the landing point is not horizontal but inclined, the ground effect on the propellers will be different for each propeller, and a rotational moment will be generated on the airframe, and the drone cannot maintain its attitude and will fail in landing. In addition, even if the drone can land, uneven grounding will occur and the airframe of the drone 1 will become unstable. Specifically, as illustrated in FIG. 1A, due to the inclined surface 2, the ground effect on the side of the drone 1 near the ground increases and the ground effect on the side far from the ground decreases. The attitude of the drone 1 becomes unstable due to the rotational moment generated due to the difference in the ground effect. Further, as illustrated in FIG. 1B, the attitude of the drone 1 becomes unstable due to the rotational moment caused by the legs of the drone 1 that are in contact with the high side of the inclined surface.

On the other hand, a method of landing the drone 1 while tilting the airframe of the drone 1 so as to match the inclined surface 2 is also conceivable. When the airframe of the drone 1 is tilted so as to match the inclined surface 2, a force is generated with respect to the drone 1 in the direction of descending toward the inclined surface 2. Therefore, if the airframe of the drone 1 is tilted while descending vertically, the airframe of the drone 1 will have a horizontal speed in the direction of descending toward the inclined surface 2, and the drone 1 cannot land stably. When the drone 1 lands, it is desirable that the horizontal speed is approximately 0. The embodiments of the present disclosure will be described in detail with reference to the above viewpoints.

Overview of Embodiments

Next, an overview of embodiments of the present disclosure will be described. In the present description, common matters in embodiments will also be described.

Overview of Embodiments

Figure 2:
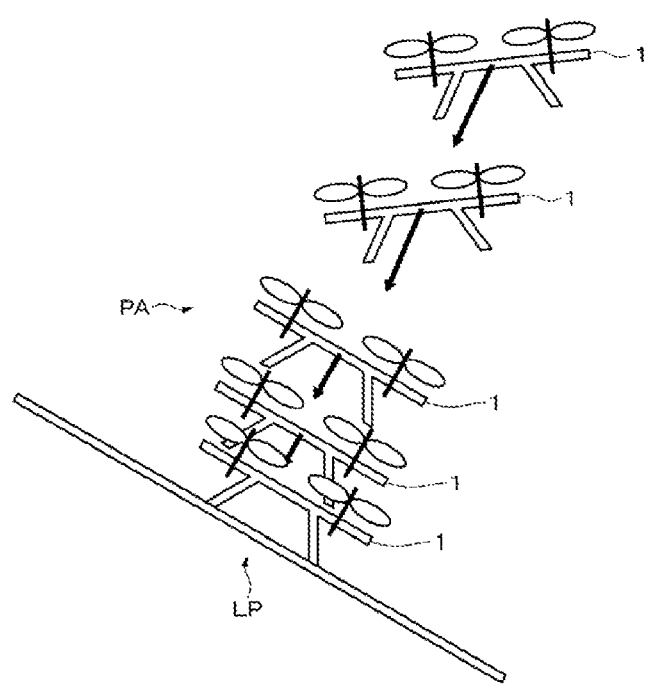
FIG. 2 is a diagram referred to when an overview of an embodiment is described.
Figure 3:
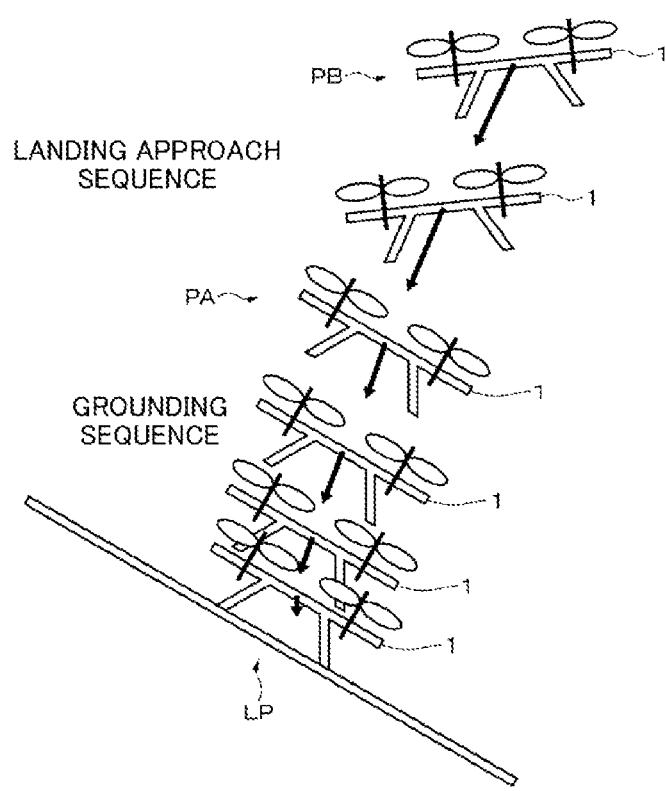
FIG. 3 is a diagram referred to when an overview of an embodiment is described.

FIGS. 2 and 3 are diagrams for describing an overview of embodiments. It is assumed that the drone 1 lands at a landing point LP illustrated in FIG. 2. The landing point LP may be a position of preset coordinates or a position of coordinates instructed by an appropriate apparatus on the ground (hereinafter appropriately referred to as a ground station).

A transition point PA is set at an appropriate position in the space, as illustrated in FIG. 2. The transition point PA is a point positioned above the landing point LP and a point at which the drone starts a landing operation. The drone 1 present at a position in a certain space (above the transition point PA) determines to land. For example, the drone 1 determines to land by itself according to an instruction through a remote controller, completion of a given task, reduction in remaining capacity of a battery, malfunction of a sensor included in the drone 1, occurrence of communication failure, and the like.

When landing is determined, the drone 1 acquires inclination information about the inclination of the landing point LP. Such inclination information may be acquired through a sensor included in the drone 1 or may be transmitted from a ground station to the drone 1. Further, the inclination information may be acquired from the current position of the drone 1 by referring to the numerical map of the drone 1.

The drone 1 determines a landing approach sequence and a grounding sequence (refer to FIG. 3). The landing approach sequence is control for the drone 1 performed from a current position (PB in FIG. 3) of the drone 1 to the transition point PA. A specific example of the landing approach sequence is information representing chronological positions of the drone 1 from the current point PB to the transition point PA and a speed of the drone 1 at each position. Here, for stable landing of the drone 1, it is desirable that a horizontal speed at the time of landing be approximately 0. Approximately 0 means that the horizontal speed is 0 or close enough to 0 for the drone 1 to safely land. Accordingly, at the transition point PA, control of assigning a horizontal speed (specifically, the horizontal speed in the direction of climbing the inclined surface of the landing point LP) to the drone 1 in advance such that the horizontal speed of the drone 1 becomes approximately 0 at the landing point LP is performed in the landing approach sequence. Specifically, rotation speeds of a plurality of motors included in the drone are controlled such that the horizontal speed of the drone becomes a set horizontal ground speed. A movement trajectory of the drone 1 from the current point PB to the transition point PA and a horizontal speed at each position are calculated such that a predetermined horizontal speed is assigned at the transition point PA, and the operation of the drone 1 is appropriately controlled on the basis of a calculation result.

The grounding sequence is control for the drone 1 performed from the transition point PA to the landing point LP. When the drone 1 detects that it has passed through the transition point PA, the drone 1 is controlled according to the grounding sequence. The grounding sequence is, for example, information representing chronological positions until landing and a vertical speed at each position. Specifically, at the transition point PA, the attitude of the drone 1 is controlled so that the attitude of the drone 1 is substantially the same as the inclination of the landing point LP. By being controlled based on the grounding sequence, as illustrated in FIG. 3, the drone 1 descends toward the landing point LP, and the horizontal ground speed given at the transition point PA gradually decreases. At the landing point LP, the horizontal speed is substantially 0, and the attitude of the drone 1 is substantially equal to the inclination of the landing point LP, so that the drone 1 can land in a stable attitude.

Common Matters in Embodiments

Next, common matters in embodiments will be described. Meanwhile, in the following description, coordinates of the landing point LP are denoted by (x, y, 0) and coordinates of the transition point PA are denoted by (x', y', H). The height of the transition point PA is appropriately referred to as a grounding sequence start altitude H in the following description. Also, the angle of inclination of the landing point LP is defined as $\theta$. As will be described later, $\theta$ is acquired by a sensor or the like of the drone 1.

Figure 4:
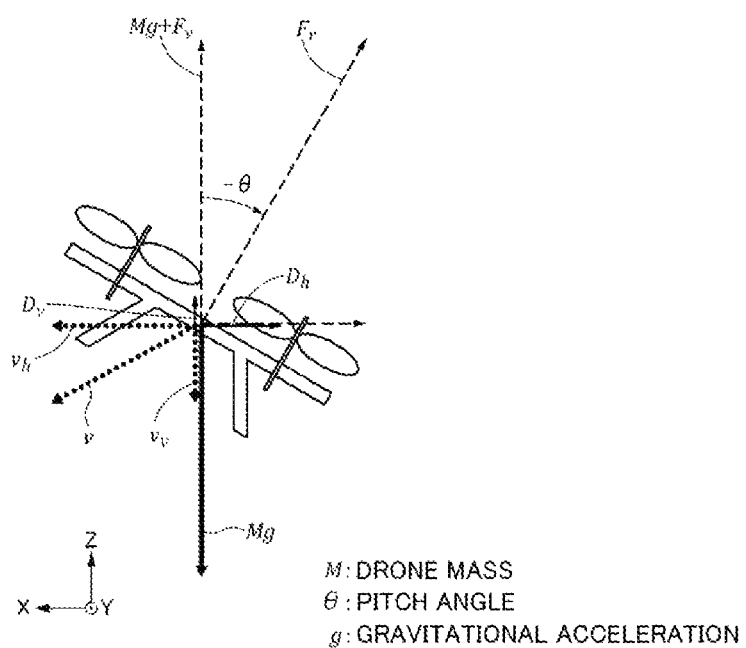
FIG. 4 is a diagram referred to when an overview of an embodiment is described.

FIG. 4 is a diagram analytically illustrating various forces applied to the drone 1 whose attitude is tilted. Here, M represents the mass of the drone 1, $\theta$ is the pitch angle (the angle corresponding to the attitude of the drone 1 and the inclination angle of the landing point LP), and g is the gravitational acceleration. The drone 1 receives the gravity of Mg in the vertically downward direction with respect to the ground. Generally, the drone 1 is controlled to apply a slightly larger force $F_v$ than the gravity Mg in the vertically upward direction with respect to the ground in order to balance the drone 1.

Further, in FIG. 4, the total thrust of all the rotors of the drone 1 (the force generated in the vertically upward direction of the airframe of the drone 1) is defined as $F_r$. Further, the air resistance in the Z direction with respect to the drone 1 is defined as $D_h$, and the air resistance in the lateral direction (with respect to the ground) with respect to the drone 1 is defined as $D_v$. Further, assuming that the speed of the drone 1 is v, the speed v can be decomposed into a horizontal speed $v_h$ and a vertical speed $v_v$. The speed v, the horizontal speed $v_h$, and the vertical speed $v_v$ are ground speeds, respectively.

The acceleration in the horizontal direction (horizontal acceleration) of the drone 1 can be expressed by Formula 1 below.

(Formula 1)

$$a_h = \dot{v}_h = (F_r \sin\theta - D_h(v_h - w_h, \theta))/M \qquad (1)$$

The acceleration in the vertical direction (vertical acceleration) of the drone 1 can be expressed by Formula 2 below.

(Formula 2)

$$a_v = \dot{v}_v = (F_r \cos\theta - D_v(v_v - w_v, \theta))/M - g \quad (2)$$

$W_h$ and $W_v$ are horizontal and vertical components of wind. In this embodiment, it is ignored (it is not considered). It is very difficult to obtain the air resistance terms $D_h(v_h - w_h, \theta)$ and $D_v(v_v - w_v, \theta)$ analytically, and usually, a table is prepared by experiment. Since the vertical component $D_v(v_v - w_v, \theta)$ of air resistance is sufficiently small as compared with the gravity it is ignored in this embodiment.

Subsequently, the time profile of the vertical speed $v_v(t)$ of the drone 1 in the grounding sequence and the horizontal speed $v_h(t)$ in the grounding sequence are determined on the basis of the altitude at the start of the grounding sequence, that is, the grounding sequence start altitude H at the height of the transition point PA, the descending speed $v_{vs}$ in the vertical direction of the drone 1 at the start of the grounding sequence, and the time $t_t$ at which the grounding sequence is executed.

First, the relationship between the grounding sequence start altitude H and the descending speed $v_{vs}$ is obtained. The altitude is obtained by integrating the vertical speed $v_v(t)$ in the grounding sequence, as illustrated in Formula 3 below.

(Formula 3)

$$h(t) = \int_0^t v_v(s) ds + H \quad (3)$$

As for time t, the timing at which the grounding sequence is started at the transition point PA is set to 0. The second term H in Formula 3 is an integration constant, and is determined from the fact that the altitude $h(0)=H$ at $t=0$. Then, since the altitude is 0 at the end of the grounding sequence (grounding time of the drone 1), that is, when $t=t_t$, it is necessary to satisfy Formula 4 below.

(Formula 4)

$$h(t_t) = \int_0^{t_t} v_v(s) ds + H = 0 \quad (4)$$

In Formula 4, since $v_v(t)$ can be freely determined by the drone 1, a function of $v_v(t)$ that satisfies Formula 4 may be determined by numerical integration.

The vertical speed $v_v(t)$ of the drone 1 is obtained by integrating the vertical acceleration $a_v(s)$ of the drone 1 as illustrated in Formula 5.

(Formula 5)

$$v_v(t) = \int_0^t a_v(s) ds - v_{vs} \quad (5)$$

$v_v(0) = -v_{vs}$ because the descending speed $v_{vs}$ is the descending speed at the start of the grounding sequence, that is, when $t=0$. Assuming that the vertical descending speed at the time of grounding, that is, when $t=t_t$ is $v_{vt}$, $v_{vt}$ can be expressed by Formula 6 below.

(Formula 6)

$$v_{vt} = -v_v(t_t) = \int_0^{t_t} a_v(s) ds + v_{vs} \quad (6)$$

Next, the function to be satisfied by the horizontal speed $v_h(t)$ of the drone 1 is obtained. The horizontal speed $v_h(t)$ is obtained by integrating the horizontal acceleration $a_h(s)$ as illustrated in Formula 7 below.

(Formula 7)

$$v_h(t) = \int_0^t a_h(s) ds + C \quad (7)$$

In Formula 7, $a_h(s)$ is the horizontal acceleration and C is an integration constant. There are two boundary conditions: one is the horizontal speed becomes 0 when grounding, and the other is the inclination of the drone 1 when grounding is equal to the inclination $\theta$ of the landing point LP. The first boundary condition is rewritten as illustrated in Formula 8 below.

(Formula 8)

$$v_h(t_t) = \int_0^{t_t} a_h(S) + C = 0 \quad (8)$$

The integration constant C is obtained from Formula 8, and the horizontal speed $v_h(t)$ can be expressed by Formula 9 below.

(Formula 9)

$$v_h(t) = \int_0^t a_h(s) ds - \int_0^{t_t} a_h(s) ds = -\int_t^{t_t} a_h(s) ds \quad (9)$$

Based on the second boundary condition, the horizontal acceleration of the drone 1 when grounding can be expressed by Formula 10 below.

(Formula 10)

$$a_h(t_t) = -(a_v(t_t) + g) \cdot \tan\theta - \frac{D_h(w_h, \theta)}{M} \quad (10)$$

In Formula 10, the term $D_h(w_h, \theta)/M$ is the air resistance term, which can be ignored at the time of landing when the horizontal speed of the drone 1 becomes slow. Therefore, the relationship between the horizontal acceleration and the vertical acceleration at the time of landing of the drone 1 can be expressed by Formula 11 below.

(Formula 11)

$$a_h(t_t) = -(a_v(t_t) + g) \cdot \tan\theta \quad (11)$$

The acceleration profiles $a_v(t)$ and $a_h(t)$ and the speed profiles $v_v(t)$ and $v_h(t)$ that satisfy the boundary conditions described so far have innumerable degrees of freedom. Therefore, in the present embodiment, it is assumed that the vertical acceleration $a_v$ and the attitude $\theta$ of the drone 1 are constant during the ground contact sequence, and a specific speed profile is obtained. Assuming that the vertical acceleration $a_v$ is a constant based on this assumption, the vertical speed $v_v(t)$ can be expressed by Formula 12 below.

(Formula 12)

$$v_v(t) = \int_0^t a_v ds - v_{vs} = a_v t - v_{vs} \quad (12)$$

Since $v_v(t) = -v_{vt}$ at the ground contact time ($t=t_t$) of the drone 1, $a_v = -(v_{vs} - v_{vt})/t_t$. Therefore, $v_v(t)$ can be expressed by Formula 13 below.

(Formula 13)

$$v_v(t) = \frac{v_{vs} - v_{vt}}{t_t} t - v_{vs} \quad (13)$$

By substituting Formula 13 into Formula 2 and integrating, the relationship illustrated in Formula 14 below can be obtained.

(Formula 14)

$$H = \frac{1}{2}(v_{vs} + v_{vt}) \cdot t_t \quad (14)$$

From Formula 14, the relationship between the grounding sequence start altitude H, the time $t_t$ required for the grounding sequence, the descending speed $v_{vs}$ of the drone 1 at the start of the grounding sequence, and the descending speed $v_{vt}$ of the drone 1 at the end of the grounding sequence (at the time of grounding) is obtained.

Next, integral is also performed for horizontal velocity as constant acceleration. Since the vertical acceleration $a_v$ is a constant, the horizontal acceleration $a_h(t)$ can be expressed by Formula 15 below.

(Formula 15)

$$a_h(t) = -(a_v + g) \cdot \tan \theta \qquad (15)$$

Since the vertical acceleration $a_v$ and the attitude $\theta$ both are constants, the horizontal acceleration is also a constant. Then, the horizontal speed $v_h(t)$ can be expressed by Formula 16 below.

(Formula 16)

$$v_h(t) = \int_{t_t}^{t_t} a_h(s)ds = -\int_{t}^{t_t} -(a_v+g) \cdot \tan \theta \, ds = -(a_v+g) \cdot \tan \theta (t - t_t) \qquad (16)$$

Here, as described above, $a_v = -(v_{vs} - v_{vt})/t_t$, so that $v_h(t)$ can be expressed by Formula 17 below.

(Formula 17)

$$v_h(t) = \frac{v_{vs} - v_{vt} - g \cdot t_t}{t_t} \cdot \tan\theta(t - t_t) \qquad (17)$$

The landing speed $v_{vt}$ during landing needs to be determined appropriately in a range allowed by the airframe of the drone 1. Also, if this value is set to 0, the altitude estimation accuracy is low, and if the altitude is estimated lower than it actually is, the airframe may resurface before landing, so this value is set to a positive value (the vertical direction is positive and $v_v(t_t)$ is a negative value).

By performing an operation using each value at t=0 based on Formula 17, it is possible to obtain the horizontal speed of the drone 1 at the start of the grounding sequence, the horizontal speed becoming approximately 0 at the time of grounding. As described above, in the present disclosure, the horizontal speed is set according to the inclination information.

Of course, the above-mentioned calculation is an example, and the horizontal speed and the like at the start of the grounding sequence of the drone 1 may be obtained by another method.

Subsequently, with reference to FIG. 5, a setting example of the transition point PA for starting the grounding sequence will be described. Since the setting example of the grounding sequence start altitude H has already been described, the setting example of the coordinates (x', y') of the transition point PA on the X-Y plane will be described here.

Figure 5:
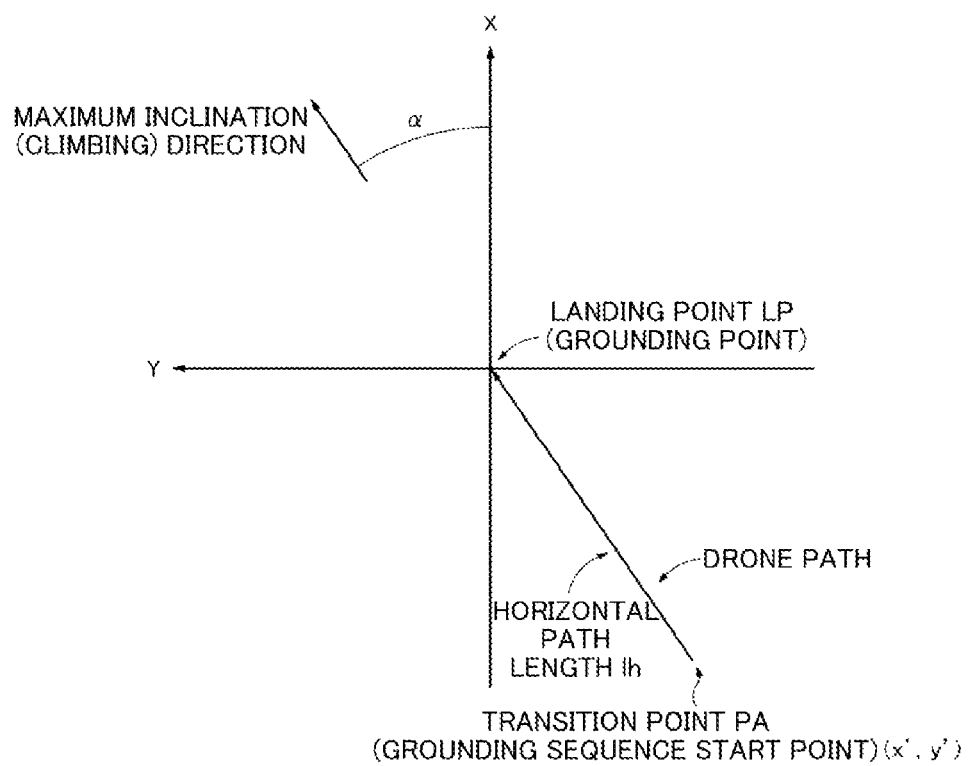
FIG. 5 is a diagram referred to when a setting example of a start point of the grounding sequence in the embodiment is described.

As illustrated in FIG. 5, the coordinates (x', y') of the transition point PA (grounding sequence start point) are calculated with the landing point LP (grounding point of the drone 1) as the origin (0,0). The coordinate system is set as illustrated in FIG. 5, and the maximum inclination of the landing point LP in the climbing direction is set to $\alpha$. Assuming that the horizontal path length in the grounding sequence of the drone 1 is $l_h$, the horizontal path length $l_h$ is the integral of the horizontal speed of the grounding sequence, and can be expressed by Formula 18 below.

(Formula 18)

$$l_h = \int_0^{t_t} v_h(t) dt \qquad (18)$$

Since the transition point PA is in the direction opposite to the direction of the maximum inclination of the landing point LP, it can be expressed by Formula 19 below.

(Formula 19)

$$x' = -l_h \cdot \cos \alpha$$

$$y' = -l_h \cdot \sin \alpha \qquad (19)$$

When it is assumed that the vertical acceleration is constant, the horizontal speed of the drone 1 can be expressed by Formula 20 below as described above.

(Formula 20)

$$v_h(t) = \frac{v_{vs} - v_{vt} - g \cdot t_t}{t_t} \cdot \tan\theta(t - t_t) \qquad (20)$$

Thus, the horizontal path length $l_h$ is expressed by Formula 21 below.

(Formula 21)

$$l_h = -\frac{1}{2}(v_{vs} - v_{vt} - g \cdot t_t)\tan\theta t_t \qquad (21)$$

The coordinates (x', y') satisfying the horizontal path length $l_h$ is set as the transition point PA. Of course, the coordinates (x', y') of the transition point PA may be set by a method other than the above-mentioned method.

First Embodiment

[Internal Configuration Example of Drone]

Figure 6:
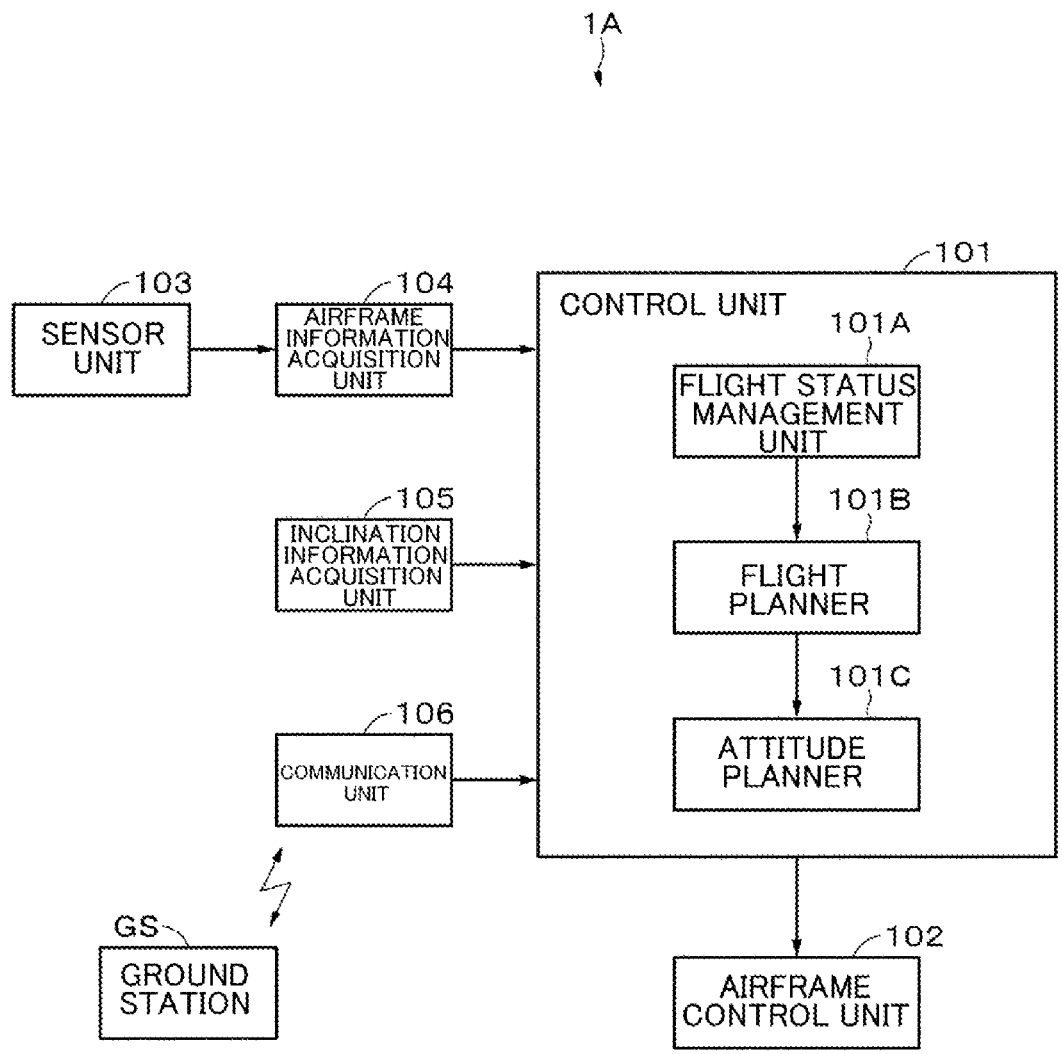
FIG. 6 is a block diagram illustrating a configuration example of a drone according to a first embodiment.

FIG. 6 is a block diagram illustrating an example of an internal configuration of a drone (hereinafter appropriately referred to as a drone 1A) according to a first embodiment. For example, the drone 1A includes a control unit 101, an airframe control unit 102, a sensor unit 103, an airframe information acquisition unit 104, an inclination information acquisition unit 105, and a communication unit 106 that communicates with the ground station GS. The control unit 101 includes a flight status management unit 101A, a flight planner 101B, and an attitude planner 101C as functional blocks. Further, although not illustrated, the drone 1A has a mechanism such as a motor and a propeller for moving itself.

The control unit 101 integrally controls the drone 1A. For example, the control unit 101 acquires inclination information regarding the inclination of the landing point and sets the horizontal speed according to the inclination information. Then, the control unit 101 controls the rotation speeds of the plurality of motors so as to have the set horizontal speed. The airframe control unit 102 operates according to the control by the control unit 101 to control the rotation speeds of the plurality of motors. As described above, the horizontal speed set by the control unit 101 is, for example, a speed that becomes substantially 0 at the landing point LP.

The flight status management unit 101A integrally manages flight statuses of the drone 1A. For example, the flight status management unit 101A determines that the drone 1A will land according to an instruction through a remote controller, completion of a given task, reduction in remaining capacity of a battery, malfunction of a sensor included in the drone 1, occurrence of communication failure, and the like.

The flight planner 101B generates a flight course plan of the drone 1A. The flight course plan is, for example, information in which chronological positions through which the drone 1A flies and speeds at the positions are defined. The flight course plan may be set in advance or set by the flight planner 101B according to a task assigned to the drone 1A, or the like. The flight planner 101B outputs the flight course plan to the attitude planner 101C.

The flight planner 101B generates an approach course plan and a grounding course plan. The approach course plan is information in which chronological positions from a current position of the drone 1A to the transition point PA and speeds at the positions are defined. In addition, the grounding course plan according to the present embodiment is information in which attitudes, chronological positions, and vertical speeds at the positions from the transition point PA to the landing point LP are defined. The flight planner 101B outputs the approach course plan and the grounding course plan to the attitude planner 101C.

The attitude planner 101C generates airframe control information depending on the flight course plan and grounding course plan output from the flight planner 101B. The attitude planner 101C generates, for example, airframe control information of the drone 1A for causing the drone 1A to reach positions and speeds (specifically ground speeds in all directions) at the positions defined in the flight course plan. The attitude planner 101C determines, for example, airframe control information including attitudes, vertical accelerations, and the like in consideration of differences in positions and speeds of the airframes according to the flight course plan.

Further, the attitude planner 101C generates, for example, airframe control information of the drone 1A for causing the drone 1A to reach positions and speeds (specifically ground speeds in all directions) at the positions defined in the approach course plan. In addition, the attitude planner 101C generates, for example, airframe control information of the drone 1A for causing the drone 1A to reach positions, vertical speeds at the positions, and attitudes defined in the grounding course plan. The attitude planner 101C outputs the airframe control information to the airframe control unit 102.

The airframe control unit 102 performs control in response to the airframe control information supplied from the attitude planner 101C. The airframe control unit 102 controls rotation speeds and the like of motors included in the drone 1A such that the drone 1A has attitudes and speeds according to the airframe control information.

The sensor unit 103 is named with a generic term for a plurality of sensors for acquiring airframe information of the drone 1A (e.g., a current position, speeds, attitudes, and the like of the drone 1A). Examples of the sensor constituting the sensor unit 103 include GPS (Global Positioning System), SLAM (Simultaneous Localization and Mapping), an acceleration sensor, a gyro sensor, a barometric pressure sensor, and the like.

The airframe information acquisition unit 104 appropriately converts sensing data input from the sensor unit 103 from analog data into digital data. Then, the airframe information acquisition unit 104 outputs the sensing data converted into the digital data to the control unit 101. The airframe information acquisition unit 104 acquires information on the current position and acceleration of the drone 1A and the environment (wind speed, atmospheric pressure, and the like) around the drone 1A.

The inclination information acquisition unit 105 acquires the inclination information corresponding to the above-mentioned θ, and outputs the acquired inclination information to the control unit 101. The inclination information can be estimated by, for example, capturing the vicinity of the landing point LP with a camera and acquiring the inclination and the normal line of the landing point LP based on the captured image. Further, the inclination information can be estimated based on an inclination map by creating the inclination map for obtaining the inclination from the current position information of the drone 1A. Further, the inclination information may be measured in advance on the ground. The inclination information may be transmitted from an external device such as the ground station GS to the communication unit 106. In this way, the inclination information can be acquired by various methods. Therefore, depending on the method of acquiring the inclination information, the sensor unit 103 and the airframe information acquisition unit 104 may function as the inclination information acquisition unit, or the communication unit 106 may function as the inclination information acquisition unit.

The communication unit 106 allows the drone 1A to communicate with other apparatuses. The communication unit 106 includes a modulation/demodulation circuit and the like according to a communication method. The communication unit 106 performs, for example, communication with a ground station GS.

[Process Flow]

Figure 7:
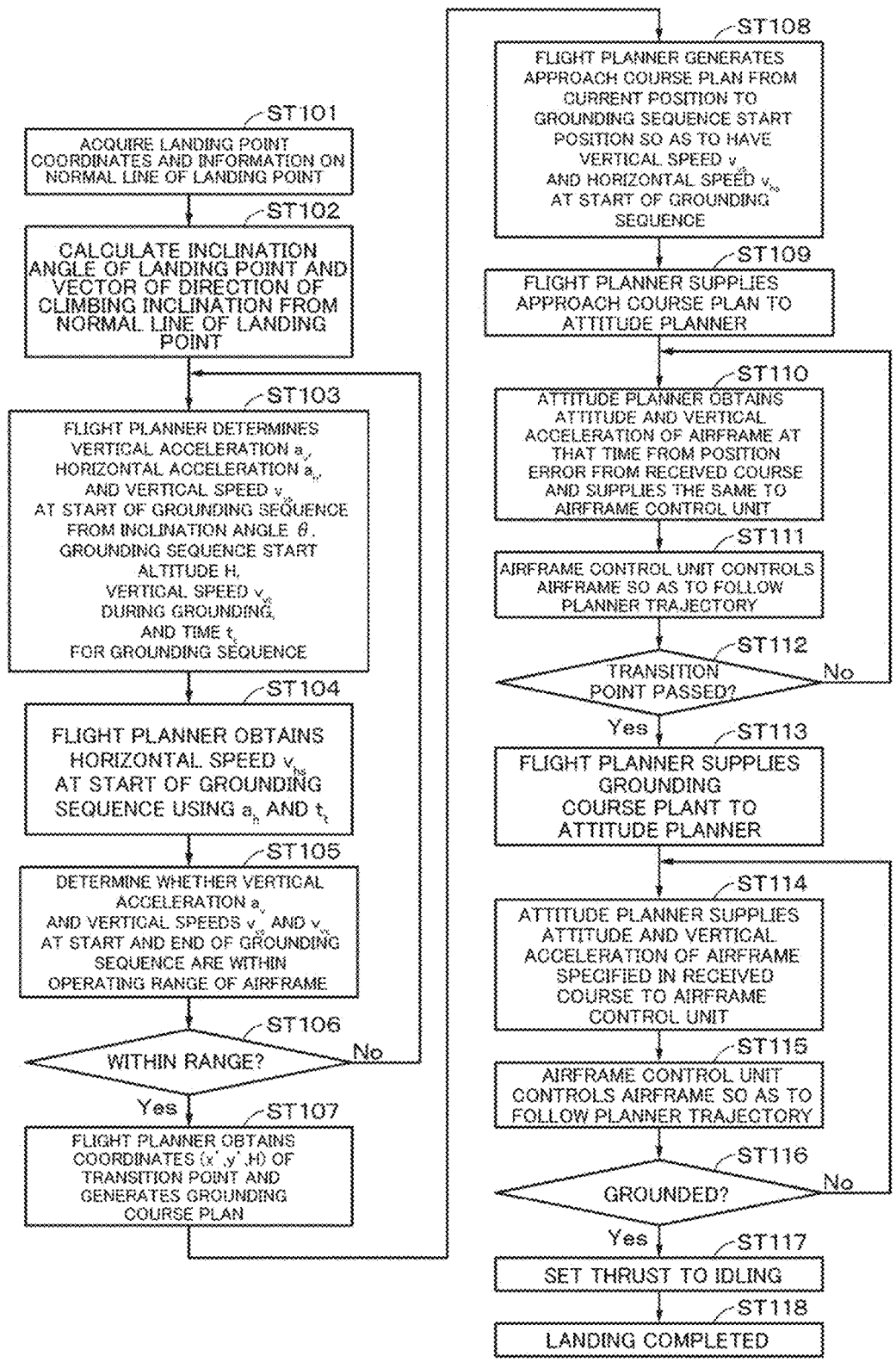
FIG. 7 is a flowchart illustrating a flow of processing performed in the drone according to the first embodiment.

FIG. 7 is a flowchart illustrating a flow of processing performed in the drone 1A according to the first embodiment. The process described below is performed, for example, after the flight status management unit 101A determines the landing.

In step ST101, the coordinates of the landing point LP and the information of the normal line of the landing point LP (information of the normal line to the surface of the landing point LP) are acquired. The coordinates of the landing point LP may be the coordinates specified on the ground station GS side, or may be determined by an appropriate method by the control unit 101 of the drone 1A. The coordinates of the landing point LP are supplied to the inclination information acquisition unit 105. The information on the normal line of the landing point LP is acquired by, for example, the inclination information acquisition unit 105 by imaging or the like. The information on the normal line of the landing point LP may be acquired by the sensor unit 103, or may be instructed by the ground station GS side. Then, processing proceeds to step ST102.

In step ST102, the inclination angle θ of the landing point LP and the vector of the direction of climbing the inclination are calculated from the information of the normal line of the landing point LP. Such calculation is performed by, for example, the inclination information acquisition unit 105. The calculation result is supplied to the control unit 101. Then, processing proceeds to step ST103.

In step ST103, the flight planner 101B determines the vertical acceleration $a_v$, the horizontal acceleration $a_h$, and the vertical speed $v_{vs}$ at the start of the grounding sequence from the inclination angle θ, the grounding sequence start altitude H, the vertical speed $v_{vt}$ when the drone 1A touches the ground, and the time $t_t$ required for the grounding sequence. Then, processing proceeds to step ST104.

In step ST104, the flight planner 101B obtains the horizontal speed (horizontal ground speed) $v_{hs}$ at the start of the grounding sequence using the horizontal acceleration and the time $t_r$ required for the grounding sequence. The obtained horizontal speed $v_{hs}$ is a speed that becomes approximately 0 when the drone 1A lands. Then, processing proceeds to step ST105. Since specific examples of the processes in steps ST103 and 104 have already been described, repeated description will be omitted.

In the present embodiment, the flight planner 101B determines whether the calculation result is within the operating range of the airframe. Specifically, in step ST105, the flight planner 101B determines whether the vertical acceleration $a_v$, the vertical speeds $v_{vs}$ and $v_{vt}$ at the start and end of the ground contact sequence are within the operating range of the airframe. Then, processing proceeds to step ST106.

In step ST106, if the determination result of step ST105 is not within the operating range of the airframe, processing returns to step ST103. When processing returns to step ST103, for example, the calculation process in steps ST103 and 104 is performed after the grounding sequence start altitude H and the like are appropriately changed. In step ST106, if the determination result of step ST105 is within the operating range of the airframe, processing proceeds to step ST107.

In step ST107, the flight planner 101B obtains the position (x', y', H) of the transition point PA. Since the setting example of the position of the transition point PA has already been described, the repeated description is omitted. Further, the flight planner 101B generates a grounding course plan that includes the attitude at the transition point PA (in this example, an attitude tilted substantially the same as the inclination angle θ), a time-series position from the transition point PA to the landing point LP, the acceleration in the vertical direction at the position, and the like. Then, processing proceeds to step ST108.

In step ST108, the flight planner 101B generates an approach course plan from a current position to the transition point PA such that the position of the transition point PA and a speed of the drone 1A at the transition point PA correspond to the horizontal speed determined in step ST104. The approach course plan can be created by an appropriate method. The approach course plan includes, for example, a plurality of discrete positions set on an appropriate course from the current position to the transition point PA and the horizontal speed and the like at a plurality of positions specified so as to finally have the horizontal speed determined in step ST104. Then, processing proceeds to step ST109.

In step ST109, the flight planner 101B delivers the approach course plan to the attitude planner 101C. Then, processing proceeds to step ST110.

In step ST110, the attitude planner 101C obtains the attitude of the airframe at each position and the acceleration in the vertical direction based on the approach course plan, and generates the airframe control information for realizing the obtained attitude and the like. Specifically, the attitude planner 101C obtains the attitude and the acceleration in the vertical direction of the airframe at that time so as to correct the position error between the position specified in the course plan supplied thereto and the current position based on the position error and generates the airframe control information in which the attitude and the acceleration are specified. Then, the attitude planner 101C supplies (delivers) the obtained airframe control information to the airframe control unit 102. Then, processing proceeds to step ST111.

In step ST111, the airframe control unit 102 performs airframe control based on the airframe control information. With such airframe control, the drone 1A moves so as to follow the trajectory planned in the approach course plan. Then, processing proceeds to step ST112.

In step ST112, it is determined whether the drone 1A has passed the transition point PA obtained in step ST107. Such a determination is determined by the flight planner 101B based on, for example, the current position of the drone 1A acquired by the sensor unit 103 and acquired by the airframe information acquisition unit 104. If the drone 1A has not passed the transition point PA, processing returns to step ST110. If the drone 1A has passed the transition point PA, processing proceeds to step ST113.

In the present embodiment, after the drone 1A has passed the transition point PA, the control of the attitude of the drone 1A and the control of the acceleration in the vertical direction are performed. In step ST113, the flight planner 101B delivers the grounding course plan to the attitude planner 101C. Then, processing proceeds to step ST114.

In step ST114, the attitude planner 101C generates airframe control information for controlling the attitude of the airframe specified in the course received from the flight planner 101B and the vertical acceleration of the drone 1A. Then, the attitude planner 101C supplies the generated airframe control information to the airframe control unit 102. Then, processing proceeds to step ST115.

In step ST115, the airframe control unit 102 controls the airframe based on the grounding course plan. As a result, the drone 1A in an attitude tilted at substantially the same angle as the inclination angle θ descends so as to follow the planned trajectory. Then, processing proceeds to step ST116.

In step ST116, for example, it is determined whether the drone 1A has grounded based on the sensor information obtained by the sensor unit 103. The determination is performed by, for example, the control unit 101. If the drone 1A has not grounded, processing returns to step ST114. When the drone 1A has grounded, the control unit 101 outputs the determination result to the airframe control unit 102. Then, processing proceeds to step ST117.

In step ST117, the airframe control unit 102 performs control of idling the thrust of the drone 1A. For example, the airframe control unit 102 performs idling control to rotate the propeller of the drone 1A at a rotation speed of a predetermined value or less (a rotation speed at which the airframe of the drone 1A does not rise). By performing such control, the user can recognize that the grounded drone 1A is not broken. The propeller of the grounded drone 1A may be stopped. Then, processing proceeds to step ST118 and the landing operation of the drone 1A is completed.

According to the above-described first embodiment, a horizontal ground speed is assigned to the drone 1A in advance at the transition point PA such that a horizontal ground speed at the time of landing becomes 0 or approximately 0. Further, after the transition point PA, the attitude of the drone 1A is controlled to be tilted substantially at the same angle as the inclination angle θ. Accordingly, it is possible to stably land the drone 1A.

Second Embodiment

Next, a second embodiment will be described. In description of the second embodiment, the same reference numerals are given to the same or homogeneous components as the above-described components and repeated description will be appropriately omitted. The matters described in the first embodiment can be applied to the second embodiment unless otherwise mentioned.

The same as the configuration of the drone 1A described in the first embodiment can be applied as a configuration of a drone (hereinafter appropriately referred to as a drone 1B) according to the second embodiment. Although an attitude (horizontal) after the transition point PA is provided as a grounding course plan in the first embodiment, the second embodiment differs from the first embodiment in that a horizontal speed from the transition point PA to the landing point LP is provided as a grounding course plan.

Figure 8:
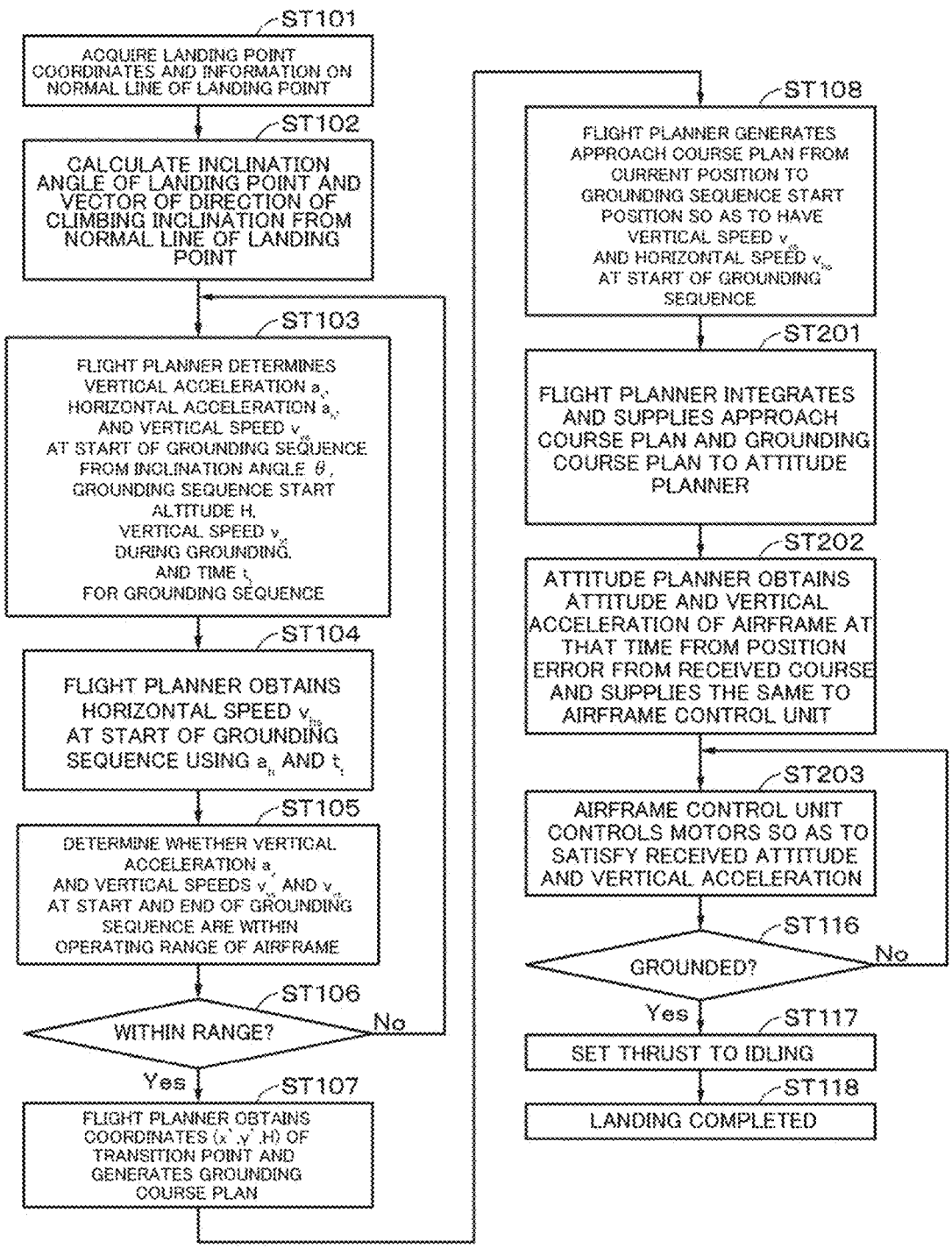
FIG. 8 is a flowchart illustrating a flow of processing performed in the drone according to the second embodiment.

FIG. 8 is a flowchart illustrating a flow of processing performed in the drone 1B. The details of processing pertaining to steps ST101 to ST108 have already been described, and thus repeated descriptions will be omitted. Meanwhile, a horizontal speed at the transition point PA and a horizontal speed at each position from the transition point PA to the landing point LP are defined in the grounding course plan generated in step ST107 in the present embodiment. The horizontal speed $v_{hs}$ at each position is set according to, for example, the distance from the transition point PA to the landing point LP. The drone 1B to which the horizontal speed $v_{hs}$ is supplied has an attitude (an attitude tilted in the direction of climbing the inclination) which is tilted substantially at the same angle as the inclination angle θ of the landing point LP after the transition point PA.

In step ST201 following step ST108, the flight planner 101B integrates the grounding course plan and the approach course plan. The flight planner 101B outputs the integrated course plan to the attitude planner 101C. Then, processing proceeds to step ST202.

In step ST202, the attitude planner 101C generates airframe control information for realizing the course plan provided thereto. Then, the attitude planner 101C outputs the generated airframe control information to the airframe control unit 102. Then, processing proceeds to step ST203.

In step ST203, the drone 1B reaches positions, attitudes at the positions, and horizontal speeds according to the course plan integrated by the flight planner 101B according to the airframe control unit 102 operating in response to the airframe control information. Then, processing proceeds to step ST116. Since the details of steps ST116, ST117, and ST118 after step ST116 have already been described, repeated description will be omitted.

As described above, according to the second embodiment, it is possible to land the drone 1B in a stable attitude by assigning horizontal ground speeds from the transition point PA to the landing point LP to the drone 1B.

Third Embodiment

Next, a third embodiment will be described. In description of the third embodiment, the same reference numerals are given to the same or homogeneous components as the above-described components and repeated description will be appropriately omitted. Further, the matters described in the first and second embodiments can be applied to the third embodiment unless otherwise mentioned.

Figure 9:
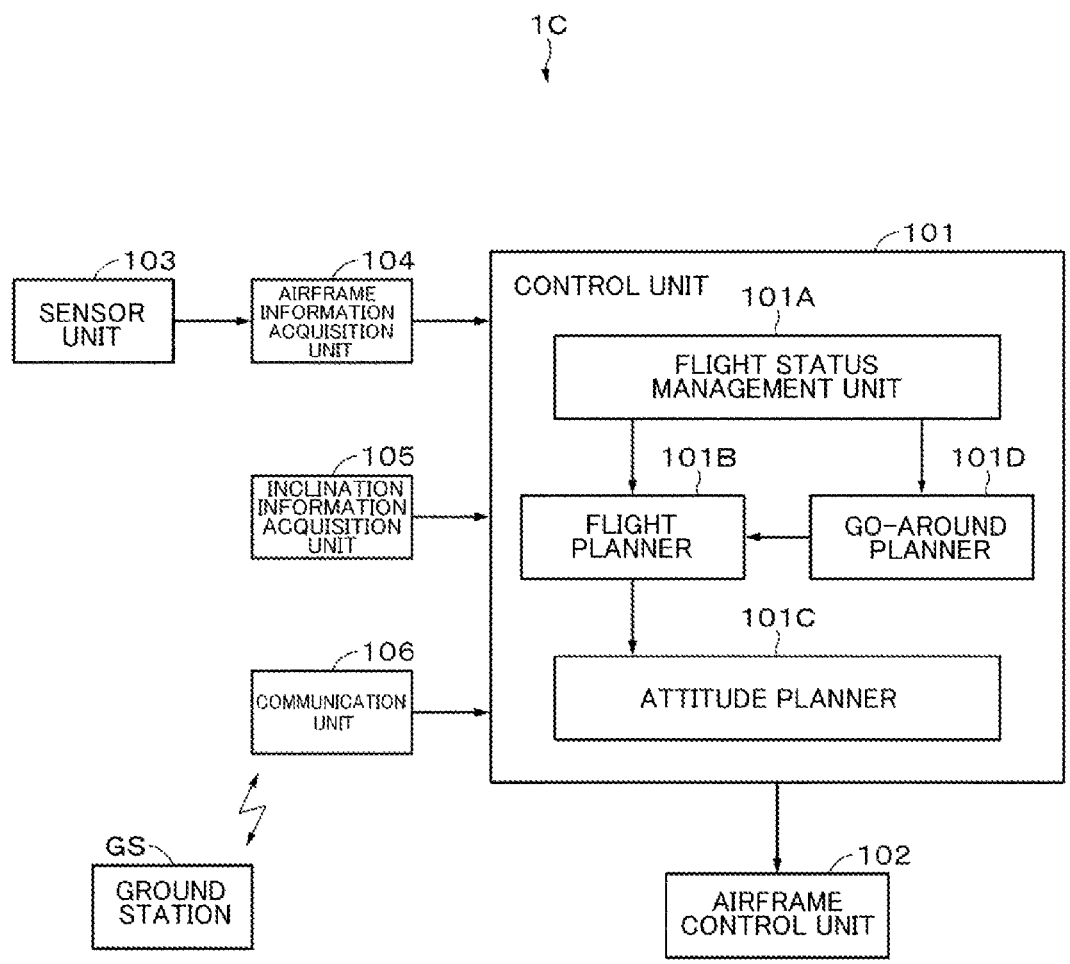
FIG. 9 is a block diagram illustrating a configuration example of a drone according to a third embodiment.

FIG. 9 is a block diagram illustrating a configuration example of a drone (hereinafter appropriately referred to as a drone 1C) according to a third embodiment. The drone 1C differs from the drones 1A and 1B in that it includes a go-around planner 101D. The go-around planner 101D is a planner that performs control to stop landing and raise the drone 1C to a safe altitude when the attitude, horizontal speed, vertical speed, and the like (hereinafter, appropriately referred to as attitude and the like) at the time of landing of the drone 1C are not within the allowable range.

Figure 10:
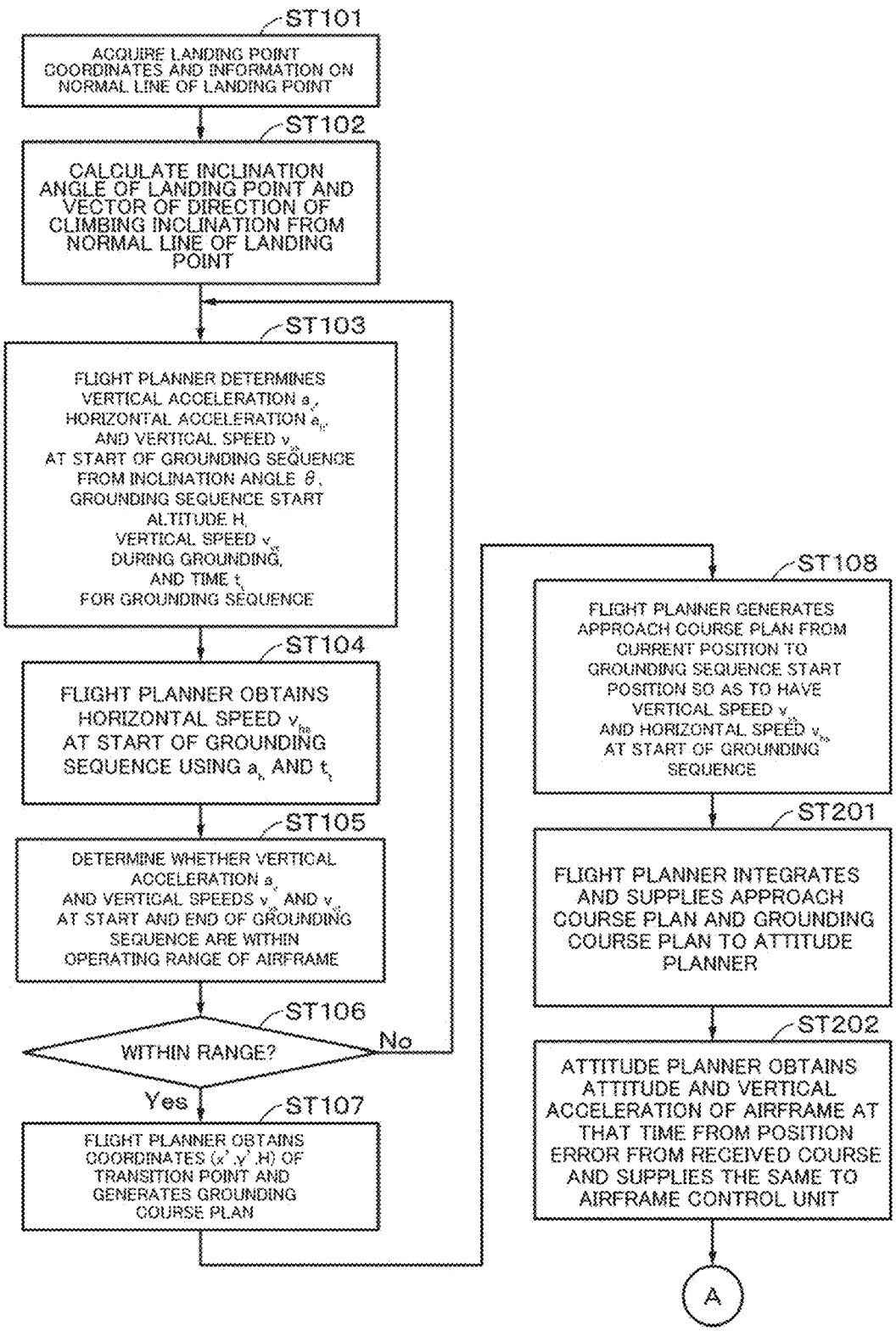
FIG. 10 is a flowchart illustrating a flow of processing performed in a drone according to a third embodiment.
Figure 11:
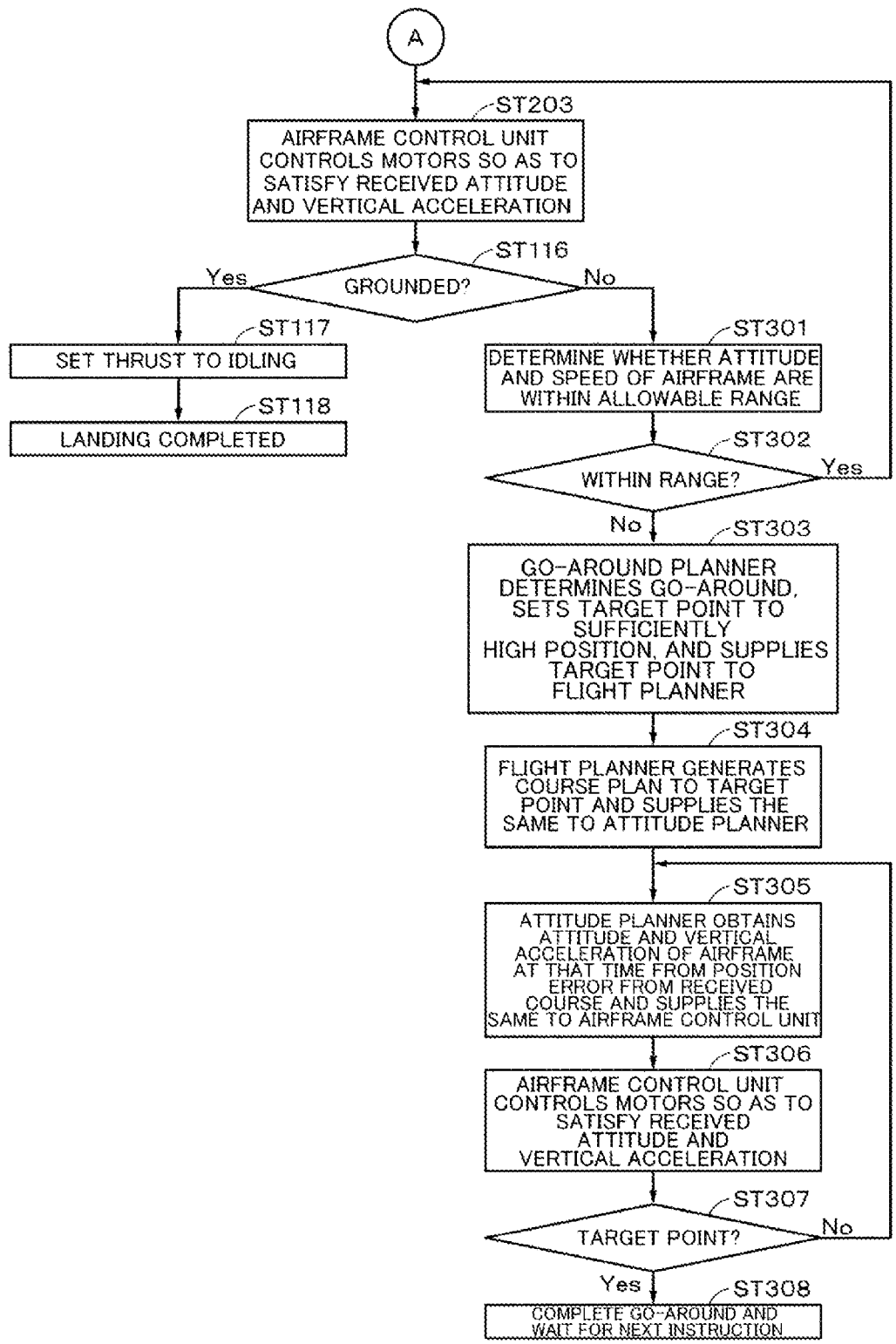
FIG. 11 is a flowchart illustrating a flow of processing performed in a drone according to a third embodiment.

FIGS. 10 and 11 are flowcharts illustrating a flow of processing performed in the drone 1C. Note that "A" illustrated in FIGS. 10 and 11 indicates continuity of processing, and does not indicate specific processing. The details of processing pertaining to steps ST101 to ST108 and processing pertaining to ST201 to ST203 have already been described, and thus repeated descriptions will be omitted. When it is determined that the drone 1C has not grounded in determination processing of step ST116 (No), processing proceeds to step ST301.

In step ST301, it is determined whether the attitude and the like of the drone 1C fall in allowable ranges. This determination is made, for example, by the go-around planner 101D. Further, the allowable range is set in advance according to the performance, size, and the like of the drone 1C. Then, processing proceeds to step ST302.

In step ST302, if the result of the determination process in step ST301 is that the attitude of the drone 1C is within the allowable range (Yes), processing returns to step ST203. In step ST302, if the result of the determination process in step ST301 is that the attitude of the drone 1C is not within the allowable range (No), processing proceeds to step ST303.

In step ST303, the go-around planner 101D determines the go-around because the attitude of the drone 1C is not within the allowable range. Then, the go-around planner 101D sets a target point at a position sufficiently higher than the current position, and supplies the set target point to the flight planner 101B. Then, processing proceeds to step ST304.

In step ST304, the flight planner 101B generates a course plan from the current position to the target point. The course plan is a course plan in which the route from the current position to the target point, an arbitrary plurality of positions set on the route, and the attitude and speed of the drone 1C at each position are specified. The flight planner 101B outputs the generated course plan to the attitude planner 101C. Then, processing proceeds to step ST305.

In step ST305, the attitude planner 101C generates airframe control information for realizing the course plan provided thereto. Specifically, the attitude planner 101C obtains the attitude and the acceleration in the vertical direction of the airframe at that time so as to correct the position error between the position specified in the course plan supplied thereto and the current position based on the position error and generates the airframe control information in which the attitude and the acceleration are specified. The attitude planner 101C outputs the generated airframe control information to the airframe control unit 102. Then, processing proceeds to step ST306.

In step ST306, the airframe control unit 102 controls the motor and the like so as to satisfy the attitude and the vertical acceleration instructed by the airframe control information supplied from the attitude planner 101C. Then, processing proceeds to step ST307.

In step ST307, it is determined whether the current position of the drone 1C is the target point. Such a determination is made, for example, by the go-around planner 101D, but may be made by another functional block. If the current position of the drone 1C is not the target point, processing returns to step ST305. When the current position of the drone 1C has reached the target point, processing proceeds to step ST308.

In step ST308, a series of go-around control is completed. The drone 1C, which has risen to a safe altitude, is in a standby state waiting for the next instruction. The drone 1C is supplied with appropriate instructions such as control for landing the drone 1C and stopping the landing again.

In the present embodiment, it is determined whether the inclination and the like of the airframe of the drone 1C are within the allowable range, but it may be determined whether any one or two of the inclination, the horizontal speed, and the vertical speed are within the allowable range, or it may be determined whether the other parameters are within the allowable range.

According to the third embodiment described above, the drone 1C can be raised to a safe altitude when the inclination and the like of the airframe are not within the allowable range. Accordingly, it is possible to prevent the drone 1C from failing to land due to the drone 1C performing the landing operation in an inappropriate attitude and the like.

Modified Examples

Although the embodiments of the present disclosure are specifically described above, the content of the present disclosure is not limited to the above-described embodiment, and various modifications are possible based on the technical idea of the present disclosure. Hereinafter, modified examples will be described.

Although a configuration in which the control unit includes a plurality of planners has been described in consideration of convenience of description in each embodiment, the present disclosure is not limited thereto. For example, the flight planner and the attitude planner may be configured as a single functional block.

A known control method for drones can be applied to the drone in each embodiment.

The present disclosure can also be realized by a device, a method, a program, a system, and the like. For example, by allowing a program that has the functions described in the above-described embodiments to be downloadable and allowing a device that has no functions described in the embodiments to download and install the program, it is possible to perform the control described in the embodiment in the device. The present disclosure can also be realized by a server that distributes the program. In addition, the present disclosure can also be realized as a tool that easily creates a flight plan described in the embodiments. The matters described in each embodiment and the modification examples can be appropriately combined.

Note that the advantageous effect described here is not necessarily limiting, and any advantageous effects described in the present disclosure may be achieved.

Further, interpretation of the content of the present disclosure should not be limited by the exemplified advantageous effect.

The present disclosure may also be configured as follows.
(1) A flying body including:
a control unit that acquires inclination information regarding inclination of a landing point and sets a horizontal speed according to the inclination information.
(2) The flying body according to (1), further including a plurality of motors, wherein
the control unit controls rotation speeds of the plurality of motors so as to have the set horizontal speed.
(3) The flying body according to (1) or (2), wherein
the horizontal speed set by the control unit is a speed that becomes approximately 0 at the landing point.
(4) The flying body according to (3), wherein
the horizontal speed is a speed given in a direction of climbing the inclination.
(5) The flying body according to any one of (1) to (4), wherein
the control unit controls so as to have the set horizontal speed at a point located above the landing point.
(6) The flying body according to (5), wherein
the control unit controls so as to have an attitude corresponding to the inclination at the point located above the landing point.
(7) The flying body according to (5) or (6), wherein
the point located above the landing point is a point at which a landing operation is started.
(8) The flying body according to (7), wherein
the control unit controls to raise an airframe when at least one of an inclination of the airframe and a ground speed exceeds an allowable range from the point at which the landing operation is started to the landing point.
(9) The flying body according to any one of (1) to (8), further including:
an inclination information acquisition unit that acquires the inclination information.
(10) The flying body according to (9), wherein
the inclination information acquisition unit acquires the inclination information from an external device.
(11) A control method in which a control unit acquires inclination information regarding inclination of a landing point and sets a horizontal speed according to the inclination information.
(12) A program for causing a computer to execute a control method in which a control unit acquires inclination information regarding inclination of a landing point and sets a horizontal speed according to the inclination information.

REFERENCE SIGNS LIST 1, 1A, 1B, 1C Drone
101 Control unit
101A Flight status management unit
101B Flight planner
101C Attitude planner
102 Airframe control unit
103 Sensor unit
105 Wind information acquisition unit
106 Communication unit
PA Transition point
LP Landing point

The invention claimed is:
1. A flying body comprising:
a sensor configured to acquire inclination information regarding an inclination of a landing point; and
a control unit configured to
acquire, from the sensor, the inclination information regarding the inclination of the landing point,
set a horizontal speed of the flying body according to the inclination information, and
control the whole flying body so as to have an attitude substantially equal to the inclination of the landing point at a point located above the landing point before the flying body is grounded.
2. The flying body according to claim 1, further comprising:
a plurality of motors,
wherein the control unit is further configured to control rotation speeds of the plurality of motors so as to have the set horizontal speed.
3. The flying body according to claim 1,
wherein the horizontal speed set by the control unit is a speed that becomes approximately 0 at the landing point.
4. The flying body according to claim 3,
wherein the horizontal speed is a speed given in a direction of climbing the inclination.

5. The flying body according to claim 1,
wherein the control unit controls so as to have the set horizontal speed at the point located above the landing point.

6. The flying body according to claim 5,
wherein the point located above the landing point is a point at which a landing operation is started.

7. The flying body according to claim 6,
wherein the control unit is further configured to control to raise an airframe of the flying body when at least one of an inclination of the airframe or a ground speed exceeds an allowable range from the point at which the landing operation is started to the landing point.

8. The flying body according to claim 1, further comprising:
an inclination information acquisition unit configured to acquire the inclination information,
wherein the inclination information acquisition is implemented via at least one processor.

9. The flying body according to claim 8,
wherein the inclination information acquisition unit further acquires the inclination information from an external device.

10. The flying body according to claim 1,
wherein the sensor includes at least one of an image sensor or a GPS sensor.

11. A control method executed by a control unit implemented via at least one processor, the control method comprising:
acquiring inclination information regarding an inclination of a landing point from a sensor mounted on a flying body;
setting a horizontal speed of the flying body according to the inclination information acquired from the sensor; and
controlling the whole flying body so as to have an attitude substantially equal to the inclination of the landing point at a point located above the landing point before the flying body is grounded.

12. The flying body according to claim 9,
wherein the external device is a ground station.

13. A flying body comprising:
a sensor configured to acquire inclination information regarding an inclination of a landing point; and
a control unit configured to
acquire, from the sensor, the inclination information regarding the inclination of the landing point,
set a horizontal speed of the flying body according to the inclination information, and
control the flying body so that an angle between a horizontal plane and a line or a plane formed by connecting at least two propellers of the flying body is substantially equal to the inclination of the landing point at a point located above the landing point.

14. The flying body according to claim 13,
wherein the angle is an angle between the horizontal plane and a plane formed by connecting at least three propellers of the flying body.

* * * * *